Feb. 16, 1954 W. V. BROWN ET AL 2,669,250
SELF-VENTING FILL CAP FOR TANK BODIES
Filed March 14, 1952 7 Sheets-Sheet 1
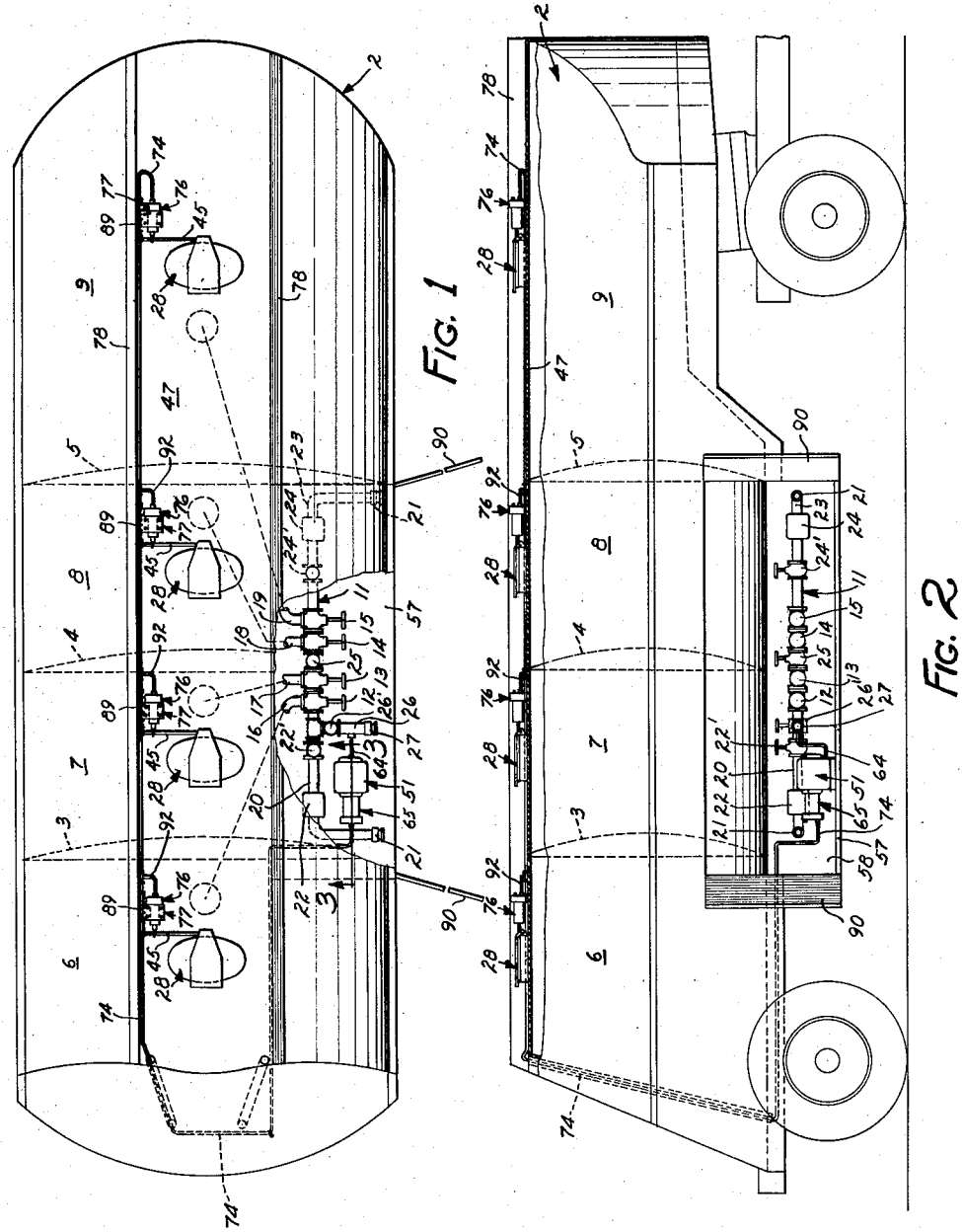
INVENTORS
WALTER V. BROWN
WARREN F. LOGEMANN
BY Paul, Moret Dugger
ATTORNEYS

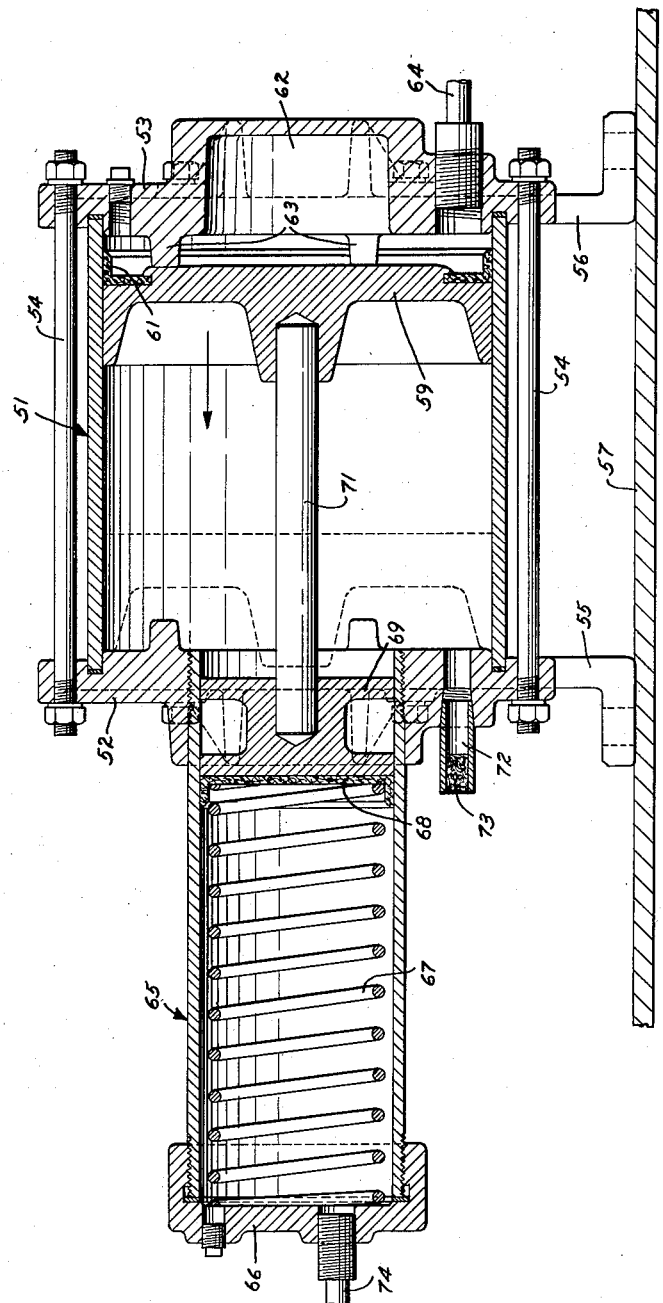

INVENTORS
WALTER V. BROWN
WARREN F. LOGEMANN
BY Paul, Moore + Dugger
ATTORNEYS

Feb. 16, 1954   W. V. BROWN ET AL   2,669,250
SELF-VENTING FILL CAP FOR TANK BODIES
Filed March 14, 1952   7 Sheets-Sheet 5

INVENTORS
WALTER V. BROWN
WARREN F. LOGEMANN
ATTORNEYS

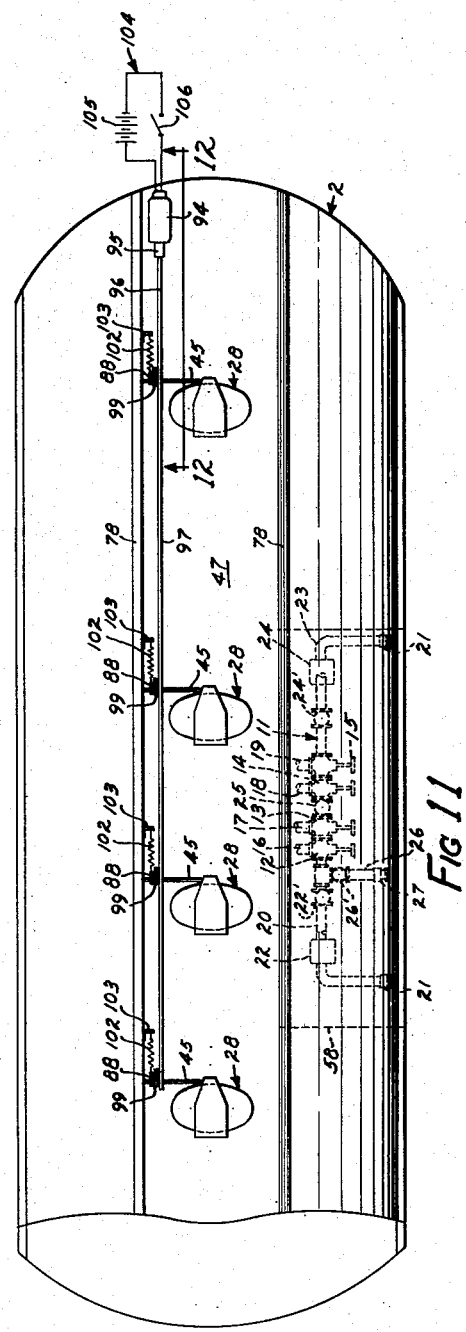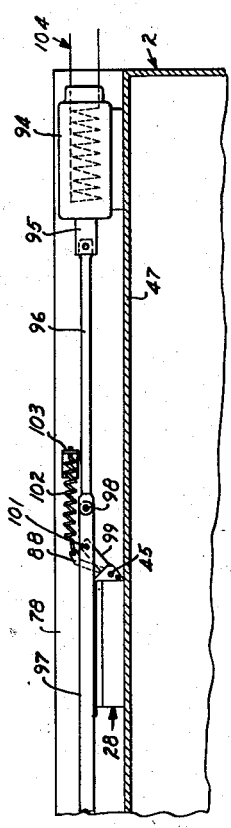

Feb. 16, 1954 W. V. BROWN ET AL 2,669,250
SELF-VENTING FILL CAP FOR TANK BODIES
Filed March 14, 1952 7 Sheets-Sheet 7
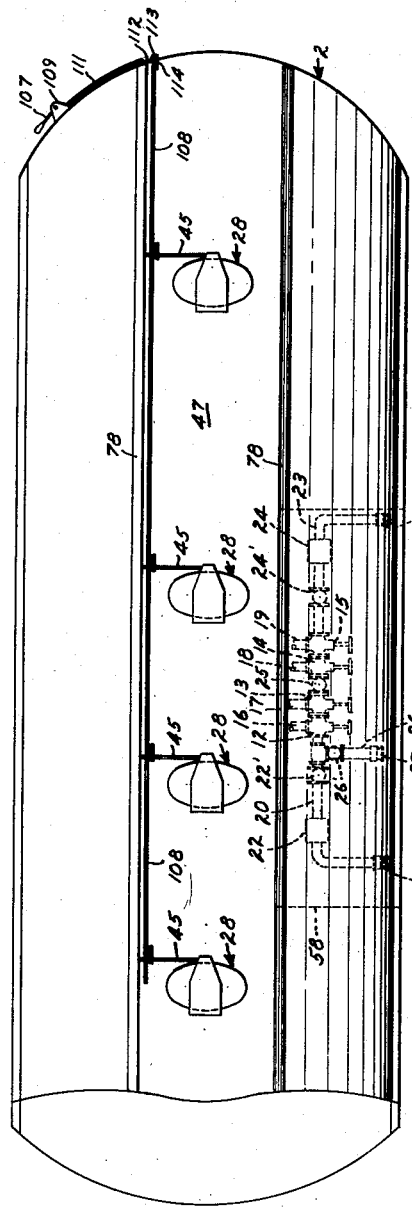
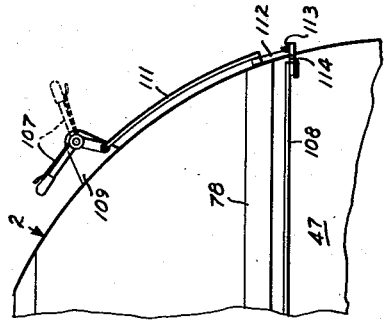
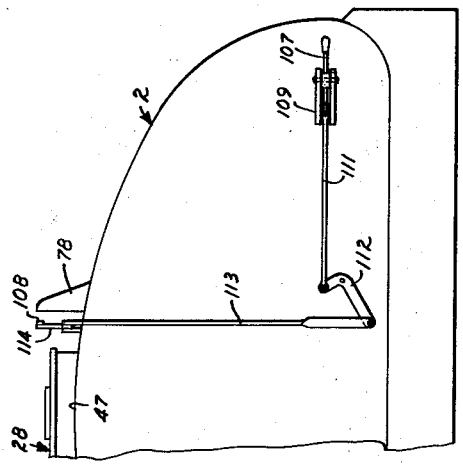
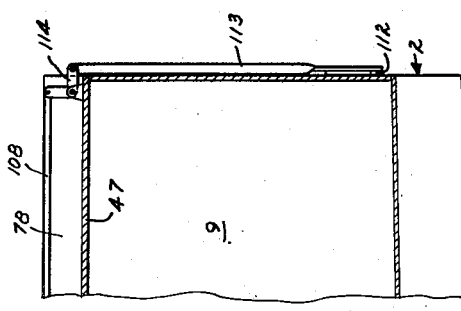
INVENTORS
WALTER V. BROWN
WARREN F. LOGEMANN
BY Paul, Moore + Dugger
ATTORNEYS

Patented Feb. 16, 1954

2,669,250

UNITED STATES PATENT OFFICE 2,669,250

SELF-VENTING FILL CAP FOR TANK BODIES

Walter V. Brown, Minneapolis, and Warren F. Logemann, St. Paul, Minn., assignors to Brown Steel Tank Company, Minneapolis, Minn., a corporation of Minnesota Application March 14, 1952, Serial No. 276,634

14 Claims. (Cl. 137—267)

This invention relates to new and useful improvements in tank bodies and more particularly to truck or mobile tanks adapted for the transportation of fluids such as oil and gasoline, or other fluids of a highly inflammable nature.

Mobile tanks used for transporting gasoline and such materials from one place to another usually comprise a plurality of compartments or chambers which may or may not be interconnected. When these compartments are independent of one another, each has a fill opening, usually located on top of the tank, and each fill opening has a suitable closure or fill cap. In the past it has been customary to fill the tank compartments through the usual fill openings provided on top of the tank. This has been found objectionable and hazardous, first, because it requires that an attendant or the operator must climb up on the tank and manually open each fill cap and position the loading arm or nozzle in filling relation thereto. As the compartments are successively filled, the operator closes each fill opening by manually securing the fill caps to their respective seats.

Secondly, when directing the liquid into each compartment from the usual loading arm or nozzle at the bulk storage station, atmospheric air is entrained with the liquid and at the same time the liquid may be so agitated in the tank that when a high volatile liquid such as gasoline is being delivered into the tank, considerable loss of liquid may result from evaporation. The filling operation may also be extremely hazardous because of the highly inflammable nature of the vapor which may issue from the fill opening in the tank compartment during the filling operation, caused by the turbulence of the liquid in the tank, it being understood that the liquid is usually delivered into each compartment under pressure. Spillage of the highly inflammable liquid may also occur which may result in a serious explosion and fire, with a resultant loss of life and property.

To overcome the objections above referred to, attempts have heretofore been made to fill the individual compartments of a truck tank from the bottom thereof, which has necessitated that each compartment be properly vented at the top to allow the atmospheric air within each compartment to escape therefrom as the level of the liquid gradually ascends in each compartment during the filling operation. The means heretofore employed for venting such tank compartments when thus filled from the bottom, has not been entirely satisfactory in that it has usually been quite complicated and expensive to install and maintain, and has not been wholly automatic in operation.

It is therefore highly desirable that means be provided for venting the upper portions of the tank compartments, which means may be embodied in the construction of the usual fill cap and its mounting, and whereby the fill caps of all of the compartments of a given tank may be quickly and conveniently released from their respective seats, when the filling operation is started, thereby to permit the atmospheric air within each compartment to freely escape therefrom as the compartments are successively and simultaneously filled from the bottoms thereof.

An important object of the present invention, therefore, is to provide a novel mechanism for venting the upper portions of the various compartments of a truck tank, which mechanism may readily be embodied in the usual mounting means of the fill caps, and which operates to automatically effect the release of the fill caps from their respective seats, each time liquid is initially introduced into the tank compartments, whereby the atmospheric air within said compartments may freely escape therefrom during the filling operation and without requiring an attendant or operator to climb onto the tank to manually manipulate the venting means.

A further object is to provide a novel mechanism for automatically releasing each fill cap from its seat by fluid pressure, the instant liquid flow is introduced into one or more of the tank compartments, said mechanism operating to automatically return the fill caps into sealing engagement with their respective seats, upon interruption of liquid flow to the compartments, as when they have received their full supply.

A further and more specific object of the invention is to mount a master cylinder adjacent to the usual manifold of the tank having one end in communication with the manifold, whereby when fluid is initially delivered to the manifold, under pressure, in the operation of filling one or more of the tank compartments, said fluid will enter the adjacent end of the master cylinder and actuate a piston mounted for reciprocal movement therein, said piston having an operative connection with a relatively smaller piston mounted in a cylinder containing a suitable pressure fluid, said smaller cylinder having a conduit connecting it with a plurality of operating cylinders, one located at each fill cap, and each operating cylinder having a piston therein operatively connected to the locking mechanism of its respective fill cap, whereby when the piston in the master cylinder is actuated by the pressure of the fluid delivered to the tank manifold, said operating pistons are simultaneously actuated to release their respective fill cap from their seats and thus permit atmospheric air within said compartments to freely escape therefrom, as the level of the liquid gradually rises within the compartments during the filling operation.

A further object is to provide a truck tank having a plurality of compartments therein, and each compartment being provided with a fill cap having means for normally locking them in closed positions, and a mechanism being operatively connected to said locking means for simultaneously automatically releasing all of said locking means each time the supply conduit is connected to the truck manifold and liquid flow is established therethrough to fill one or more of the tank compartments.

A further object is to provide a mechanism for simultaneously releasing the fill caps from their respective seats when the tank compartments are to be filled, which mechanism comprises a single control element conveniently located adjacent to the driver's cab, or elsewhere on the tank truck, whereby the fill caps of a given truck tank may be quickly and simultaneously released from their seats to permit venting of the liquid compartments during the filling operation, and whereby the fill caps may as readily be restored to sealing engagement with their respective seats, when the filling operation has been completed.

Other objects of the invention reside in the simple and inexpensive construction of the venting mechanism, which may readily be embodied in the pivotal mounting means of each fill cap without requiring any major alterations thereto, and which venting mechanism is adapted to be actuated by manipulation of a single control element located remote from the fill caps; in the provision of an electrically operated venting mechanism of this general type; and in the provision of such a mechanism which may be entirely automatic in operation whereby it does not require the attention of an operator each time the tank compartments are to be filled or emptied.

Other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a top view of a conventional trailer tank showing the invention embodied therein;

Figure 2 is a side view of Figure 1;

Figure 3 is an enlarged detail sectional view substantially on the line 3—3 of Figure 1, showing the arrangement of the master cylinder and piston and the operating cylinder and piston connected therewith;

Figure 11 is a view showing a slightly modified construction wherein the fill cap locking means is electrically operated;

Figure 12 is a detail sectional view substantially on the line 12—12 of Figure 11, showing the operative connection between the actuating member of the fill cap and the solenoid;

Figure 13 is a view similar to Figure 11 showing the fill cap locking means adapted for manual operation; and Figures 14, 15 and 16 are fragmentary detail views of the manually operable means for locking or releasing the fill caps, shown in Figure 13.

Figure 4:
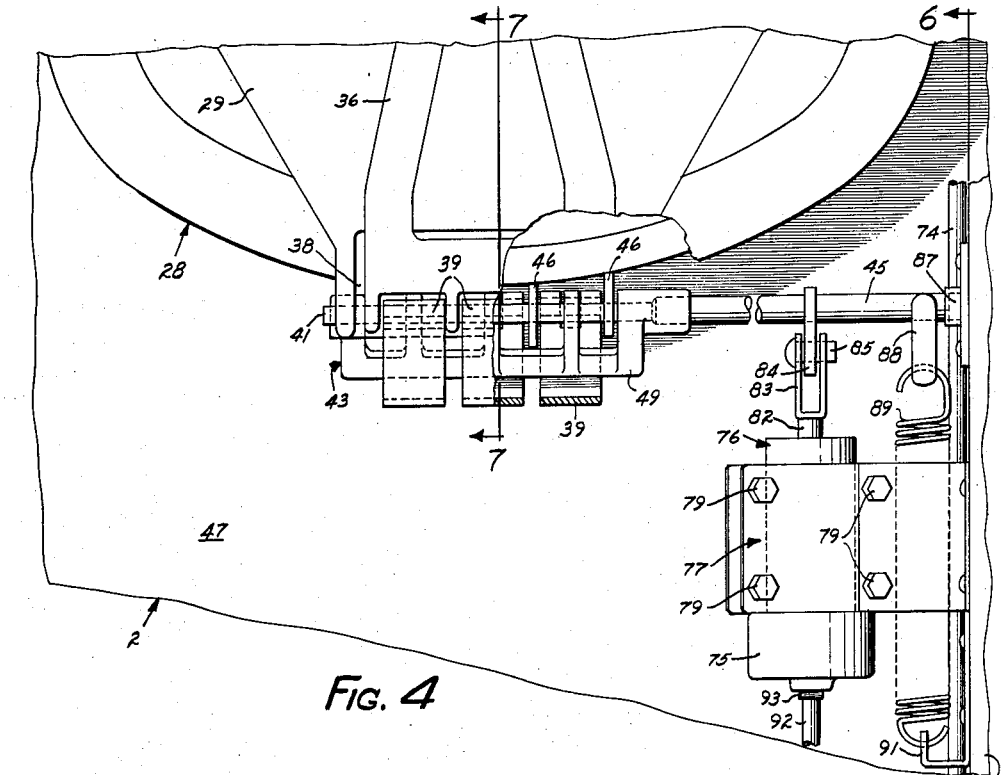
Figure 4 is a plan view of a portion of a fill cap, showing the operating mechanism connected thereto.

In the selected embodiment of the invention herein disclosed there is illustrated in Figures 1 and 2, for purposes of disclosure, a conventional truck or trailer tank comprising an elongated body 2 having a plurality of bulkheads 3, 4 and 5 therein for dividing the interior of the tank into a plurality of compartments 6, 7, 8 and 9, respectively. These compartments are provided with means for introducing a liquid fuel thereinto, and is here shown comprising a manifold 11 having a plurality of valves 12, 13, 14 and 15, therein having conduits 16, 17, 18 and 19 connecting them with the compartments 6, 7, 8 and 9, respectively, as indicated by the dotted lines in Figure 1.

In Figures 1 and 2 it will be noted the manifold 11 is located at one side of the tank body 2 and at an elevation below the bottom of the tank whereby the compartments 6, 7, 8 and 9 are filled from the bottom. The manifold is shown having a rearward extension 20 provided with a terminal fitting 21 to which one end of a conduit or hose, not shown, may be connected for emptying the tank compartments. A liquid measuring meter 22 and a shut-off valve 22' are interposed on the extension 20 for measuring and controlling fuel flow from the compartments, as is well known in the trade. The manifold 11 also has a forward extension 23 having a terminal fitting 21 similar to the one provided on the rearward extension 20, to facilitate attaching a conduit thereto. A measuring meter 24 and shut-off valve 24' are also provided in extension 23. A shut-off valve 25 may also be interposed between the valves 13 and 14, as illustrated in Figures 1 and 2.

The manifold 11 has a lateral extension 26 provided at its outer end with a suitable coupling 27 whereby a filling or loading conduit, not shown, may be connected thereto for conducting fluid from the source of supply at the loading station to the various compartments of the tank body. A valve 26' is provided in the extension 26 for controlling liquid flow therethrough.

The arrangement of valves 12 to 15, inclusive, and 22', 24', 25 and 26' in the manifold 11 is such that all of compartments may be filled at one time or, if desired, they may be filled one at a time.

When filling the tank compartments from their bottoms, as herein disclosed, it is essential that means be provided for venting each compartment to allow atmospheric air therein to escape therefrom, as the level of the liquid rises therein during the filling operation. To thus vent the various tank compartments constitutes an important feature of the present invention. As herein disclosed, all of the fill caps 28 of compartments 6, 7, 8 and 9, respectively, are vented simultaneously, the instant the flow of liquid into one or more of the compartments is initiated, and such venting is accomplished automatically by the pressure of the fluid introduced into the manifold 11 for distribution to the various compartments. To thus automatically break the seal between each fill cap and its seat, means is provided for automatically actuating the locking means for the fill caps, which will next be described.

Figure 7:
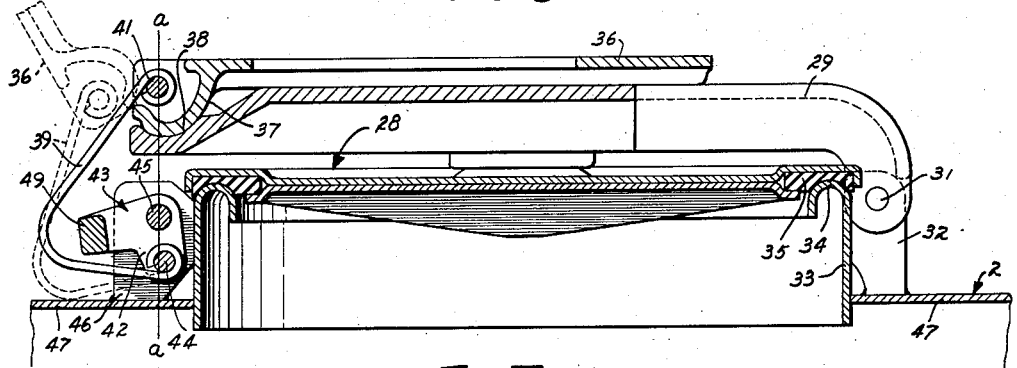
Figure 7 is a detail sectional view on the line 7—7 of Figure 4, with the parts positioned as shown in Figure 6.
Figure 10:
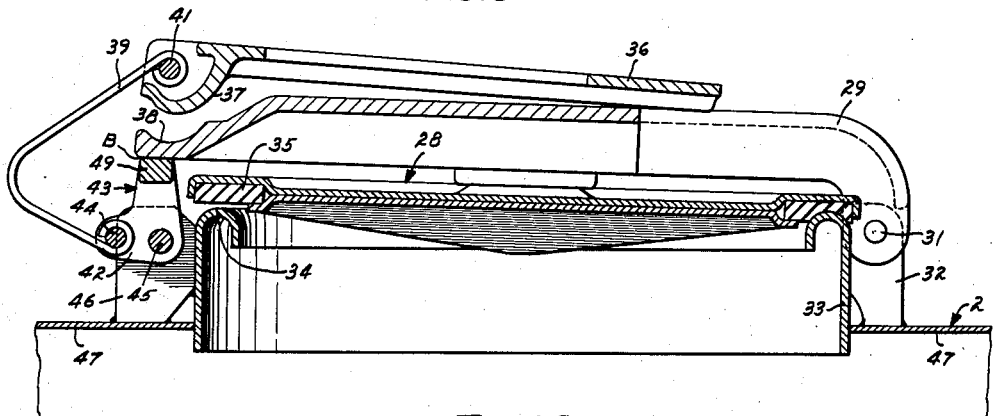
Figure 10 is a detailed sectional view similar to Figure 7, but showing the parts positioned as shown in Figure 9.

As best illustrated in Figures 7 and 10 each fill cap 28 is shown having its central portion operatively connected to a member 29 pivoted at 31 to a lug or projection 32 provided upon the usual collar 33 which defines the fill opening of each compartment. Each collar 33 has a convex seat 34 at its upper edge adapted to be engaged by a gasket 35 supported in an annular recess provided in each fill cap 28. When the fill caps are in their normal closed positions, as shown in Figure 7, the gaskets 35 thereof will sealingly engage their respective seats 34 to prevent leakage of gaseous fumes or vapors from the various compartments of the tank body.

A locking lever 36 has a convex portion 37 at one end adapted to be received in a concave seat 38 provided in the opposite end of the pivoted member 29, as shown in Figure 7. A plurality of U-shaped spring elements 39 have their corresponding ends pivotally connected to the locking lever 36 by a pivot pin 41, and the opposite ends of said spring elements are pivoted to the lower arms 42 of a plurality of bellcranks 43 by pivot pins 44. The bellcranks 43 are secured to a rockshaft 45 supported in spaced apertured lugs 46 secured to the collar 33 of the fill opening and the top wall 47 of the tank. The bellcranks 43 are tied together for simultaneous operation by an elongated bar 49 which, to facilitate manufacture, may be cast integral with the bell element 43, as will be understood by reference to Figures 4 and 7.

The pivots 41, 44 and 45 are so disposed relative to one another that when the bar 49 is in the position shown in Figure 7, the lower pivot 44 has passed over a line a—a drawn through the axes of pivots 41 and 45, or to an over-the-center position relative to pivots 41 and 45, whereby the spring elements are placed under tension to retain the fill caps 28 in sealing engagement with their respective seats 34 through the locking lever 36, as will readily be understood by reference to Figure 7. To open a fill cap, its locking lever 36 may be swung upwardly and rearwardly as indicated by the dotted lines in Figure 7, whereby the pivoted member 29 is released and may be swung upwardly to lift the fill cap from its seat, as is well known.

To automatically release the fill caps from their seats to permit atmospheric air to escape from the compartments being filled, means is provided for imparting a rocking motion to the pivot pins or shafts 45 as soon as the filling operation is started, and whereby the operating member or bar 49 of each fill cap locking lever is swung to the position shown in Figure 10 when so positioned, the gaskets 35 of the fill caps are partially lifted from their seats to provide vent openings through which the air within the compartments may readily escape to the atmosphere during the filling operation.

The means provided for thus automatically actuating the bellcranks 43 to release the fill caps from their respective seats is shown comprising a master cylinder 51 having heads 52 and 53 secured to the ends thereof by suitable bolts 54. The heads 52 and 53 may be provided with legs 55 and 56, respectively, adapted to be secured to the bottom wall 57 of the side compartment 58 of the truck body which houses the manifold and control valves or apparatus, as illustrated in Figures 1 and 2.

A piston 59 is mounted for reciprocal movement within the cylinder 51 and has a cup-shaped gasket 61 secured thereto for preventing leakage of the pressure fluid from the pressure chamber 62 provided in the cap 53. The cylinder head 53, it will be noted by reference to Figure 3, is provided with suitable spacing lugs 63 adapted to engage the adjacent end of piston 59 to space it from the head 53 so that the pressure fluid introduced into the pressure chamber 62 may contact the entire end area of piston 59. A conduit 64 has one end secured in the head 53 and is in communication with the chamber 62. The opposite end of the conduit 64 is connected to the extension 26 of the manifold, whereby when fluid under pressure is delivered into extension 26 from the loading hose or conduit, a portion of said fluid will enter chamber 62 of the master cylinder 51 and thus force its piston 59 towards the opposite end of the cylinder.

Secured to the cylinder head 52 at the opposite end of the master cylinder 51 is a relatively smaller operating cylinder 65 having a head 66 secured to its outer end, as clearly illustrated in Figure 3. A suitable spring 67 is mounted within the cylinder 65 and has one end seated against the head 66 and its opposite end against a cup-shaped gasket 68 fitted against the end of a piston 69 mounted for reciprocal movement within cylinder 65. Piston 69 is secured to piston 59 by a connecting rod 71, whereby the two pistons are adapted for simultaneous operation when fluid is introduced into the chamber 62 of the master cylinder. An air vent 72 is shown provided in the head 52 of the master cylinder to prevent the formation of a back pressure or vacuum therein, when piston 59 is reciprocated in cylinder 51. A suitable filter material 73 is provided in the air vent 72 to prevent foreign matter from entering therethrough into cylinder 51.

Figure 5:
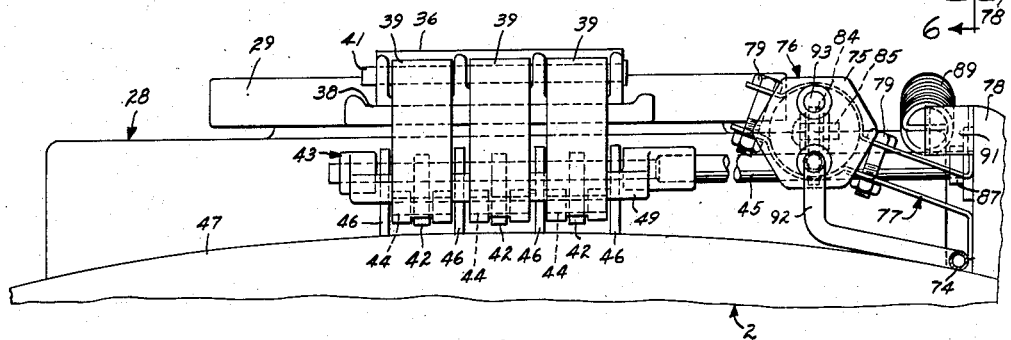
Figure 5 is a view looking at Figure 4 from the right hand end thereof.

Connected to the head 66 of the operating cylinder 65 is one end of a conduit 74, the opposite end of which is connected to a cylinder head 75 secured to one end of a small cylinder 76 which is shown supported by a split bracket, generally designated by the numeral 77. The bracket 77, it will be noted by reference to Figure 4, may be secured to one of the longitudinally extending overturn protection rails 78 provided on top of the tank, as shown in Figures 1, 4 and 5. The cylinders 76 are secured in position in brackets 77 by suitable bolts 79.

Each cylinder 76 has a piston 81 therein to which one end of a connecting rod 82 is suitably secured, the opposite end of each connecting rod is preferably forked, as shown at 83 in Figure 4, and is pivoted to an arm 84 by a pin 85. Arm 84 is fixedly secured to a rock-shaft 45 having one end secured to the pivot shaft or rod 46 to which the bellcranks 43 are secured. The opposite end of shaft 45 is rotatively supported in a bearing 87 secured to the top rail 78, as will be understood by reference to Figure 4.

Figure 6:
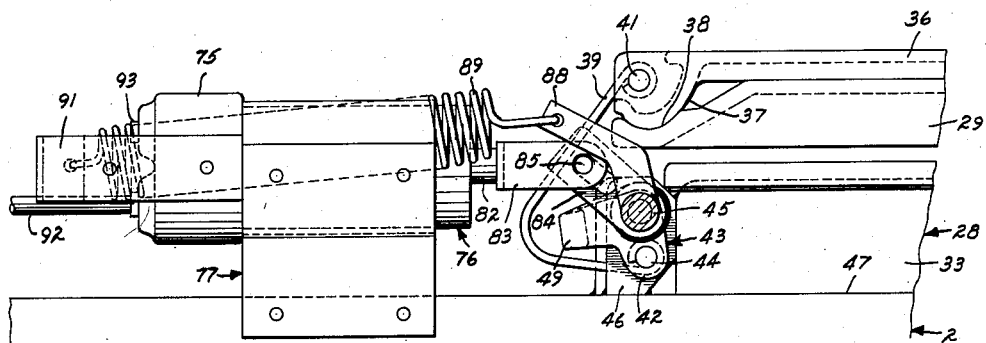
Figure 6 is a detail sectional view on the line 6—6 of Figure 4, showing the fill cap locking means in operative position.
Figure 8:
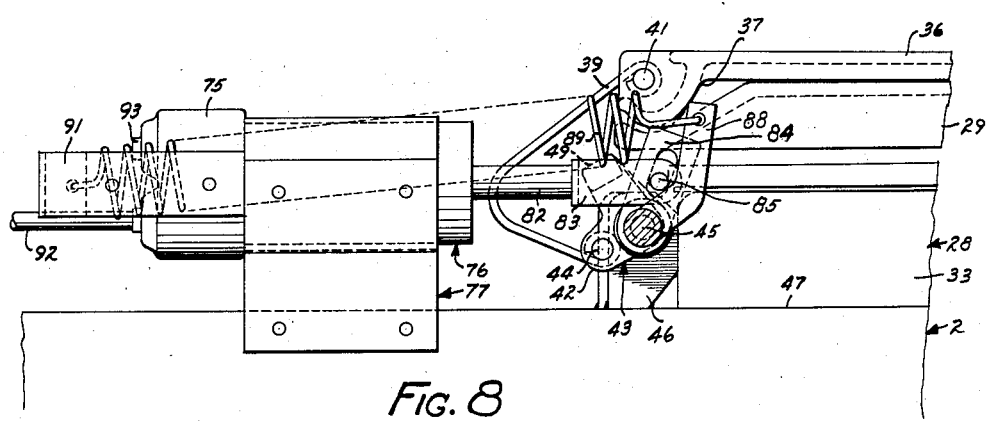
Figure 8 is a view corresponding to Figure 6, but showing the operating mechanism actuated to release the fill cap from its seat.
Figure 9:
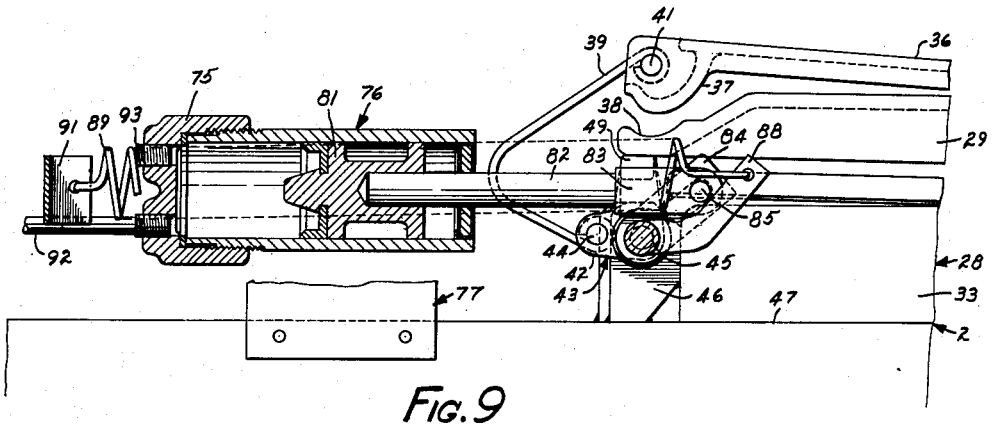
Figure 9 is a detailed sectional view showing the operating mechanism positioned to positively lift the fill cap from its seat.

A second arm 88 is secured to the rock-shaft 45 and has one end of a spring 89 secured thereto, the opposite end of which is attached to a fixed bracket 91 which may be secured to the top rail 78, as shown in Figure 4. The spring 89 constantly exerts a force on the arm 88 to rock the shaft 45, and therefore the operating member 49 in a counter-clockwise direction, when viewed as shown in Figures 6, 8 and 9, thereby to normally retain the fill cap in sealtight engagement with its seat 34.

In operation, cylinders 51 and 65, conduit 74, and all cylinders 76 are filled with a suitable inelastic pressure fluid so that each time liquid fuel enters chamber 62 of the master cylinder from loading extension 26, such liquid fuel will cause the piston 59 of the master cylinder, and also the piston 69 in the operating cylinder 65 to move in a direction towards the left, when viewed as shown in Figure 3. Such movement of pistons 59 and 69 will force the liquid or fluid in conduit 74 into cylinders 76, whereby the pistons 81 thereof are simultaneously actuated to partially rotate all rock-shafts 45 and thereby automatically release the fill caps from their respective seats, as will be readily understood by reference to Figures 9 and 10. Conduit 74 preferably leads from the operating cylinder 65 directly to the cylinder 76 of the foremost fill cap 28, and the cylinders 76 of the remaining fill caps have branch conduits 92 connecting them to conduit 74, as illustrated in Figure 1. A vent plug 93 is preferably provided in the cylinder head 75 of each cylinder 76 to release therefrom any air which may be entrapped therein with the pressure fluid, when initially introduced into the closed system.

The apparatus above described, and as illustrated in Figures 1 and 2 operates in the following manner: when it is desired to fill one or more of the compartments 6, 7, 8 and 9, the loading hose at the bulk storage plant is connected to the fitting 27 of the lateral extension 26, and the shut-off valve 26' may then be opened to permit the liquid fuel to enter manifold 11. If the two rearward compartments 6 and 7 are to be filled with a certain kind of liquid fuel, valves 12 and 13 are opened to permit the fuel to flow through conduits 16 and 17 to their respective compartments 6 and 7. The liquid fuel is delivered to the lateral extension 26 under pressure, and as the chamber 62 of the master cylinder 51 is in direct communication with the lateral extension 26 through the conduit 64, the fluid will enter chamber 62 and move the piston 59 in the direction indicated by the arrow in Figure 3, whereby the piston 69 of the operating cylinder 67 is moved toward the head 66 of said cylinder against the compression of the spring 67.

Such movement of piston 69 by piston 59 will cause the fluid in cylinder 65 to be forced through conduit 74 and into each of the relatively smaller cylinders 76 of the four fill caps at the top of the tank. As the fluid is thus forced into cylinders 76 the pistons 81 thereof are actuated to partially rotate shafts 45 of the fill caps and thereby actuate the bellcranks 43 to release the tension in the U-shaped springs 39 of each fill cap, whereby the fill caps may readily be lifted off their seats 34 when the members 49 engage the edges of their respective fill caps, as shown in Figure 10. When the fill caps are thus positioned, air within the compartments may readily escape therefrom through the gaps provided between the seat 34 and gasket 35 of each fill cap, as will readily be understood.

As long as liquid fuel is flowing through the lateral extension 26 of the tank compartments, the piston 59 of the master cylinder 51 is retained in the dotted line position shown in Figure 3, whereby the pistons 81 of the cylinders 76 of the fill cap locking mechanisms are retained in the positions shown in Figure 9, wherein it will be noted that the fill caps 28 are retained in open position. See also Figure 10.

When the compartments being filled have received their full charge or load, shut-off valves 12, 13 and 26' may be closed and the loading conduit may then be detached from the lateral extension 26. Such interruption of fluid flow through extension 26 releases the fluid pressure against piston 59, whereupon spring 67 restores piston 59 to its normal position, shown in full lines in Figure 3, assisted by the springs 89 of the relatively smaller cylinders 76. The pistons 81 of cylinders 76 are simultaneously returned to their normal positions, shown in Figure 6, and at the same time the U-shaped springs 39 are placed under tension to retain the fill caps 28 in sealing engagement with their respective seats, as will readily be understood by reference to Figure 7. In this figure it will be noted the lower pivots 44 of the springs 39 of each fill cap, have passed over the line a—a drawn through the axes of pivots 41 and 45, whereby the fill caps are firmly locked to their seats to prevent any possible danger of leakage from the fill openings.

From the foregoing, it will be noted that the venting of the fill caps is completely automatic, and is accomplished entirely by the pressure of the liquid fuel flowing through the extension 26 to the tank compartments being filled, through the medium of the master cylinder 51. The forward compartments 8 and 9 may be filled in identically the same manner as the rear compartments 6 and 7, by manipulation of valves 14, 15 and 25.

When the contents of the tank compartments 6, 7, 8 and 9 are to be discharged therefrom into a suitable receiving tank or tanks, one end of a suitable hose is connected to one or the other of the fittings 21 provided at the ends of the drain extensions 20 and 23, and the proper valves are then manipulated to permit liquid fuel to drain from the compartments to be emptied. As the liquid fuel flows from the tank compartments, it passes through one or the other of the two measuring meters 22 or 24, which record the number of gallons delivered into the receiving tank. Suitable doors 90, shown in Figures 1 and 2, are provided for closing the side chamber in the truck body where the control valves and manifold are disposed, as will be understood.

Figures 11 and 12 illustrate a slightly modified construction wherein electrical means is provided for simultaneously releasing the fill caps 28 from their respective seats for the purpose of venting the compartments during the filling or emptying operations. As schematically illustrated in Figure 11, a solenoid, generally designated by the numeral 94, is mounted at some suitable location on the truck body and has a movable element 95 therein to which one end of a connecting rod 96 is attached, as best illustrated in Figure 12. The opposite end of connecting rod 96 is pivotally connected to the forward end of an elongated bar 97 by a suitable pivot pin 98. In the form shown in Figures 11 and 12, the rock shafts 45 of the locking mechanisms of the fill caps each have an arm 99 secured thereto which correspond to the arms 84 of the form shown in the previous figures.

The arms 99 are pivoted to the bar 97 by pivot pins 101 whereby all of the rock-shafts of the fill caps are simultaneously operated when the bar 97 is actuated by the solenoid 94. The bar 97 is normally retained in its forward position to secure the fill caps in their closed positions by suitable springs 102, similar to the springs 89 of the previous figures. Springs 102 each have one end connected to an arm 88 provided on the rock-shafts 45, and the opposite ends of said springs are secured to fixed brackets 103 whereby all springs 102 cooperate to constantly urge the locking mechanisms into operative positions to secure the fill caps in leaktight engagement with their respective seats 34, as shown in Figures 6 and 7.

The solenoid 94 has an electric circuit 104 which is shown connected to the usual battery 105 of the truck. A suitable control switch 106 is provided in the circuit 104 and may be located at any convenient location on the vehicle as, for example, in the driver's cab, or in the side compartment which houses the various control valves, illustrated in Figures 1 and 2.

The mechanism illustrated in Figures 11 and 12 operates as follows: normally the operating bar 97 is in its forward position whereby the fill caps are secured in closed positions as illustrated in Figures 6 and 7. When it is desired to release the fill caps from their respective seats to vent the fuel compartments, the switch 106 is closed, whereupon the movable element 95 of the solenoid, which normally is retracted, is thrust outwardly and thereby rearwardly moves the operating bar 97 through the connecting rod 96 and thus effects operation of the bellcranks 43 of the fill caps. Such operation of bellcranks 43 will cause members 49 of the bellcranks to swing into engagement with the pivoted members 29 of the fill caps, as shown at B in Figure 10, and thereby temporarily lock the fill caps in partially open positions.

When the fuel compartments of the truck tank have been filled or emptied of their contents, the operator opens switch 106, whereupon the springs 102 cooperate to actuate the rock-shafts 45 and thereby again place the U-shaped springs 39 under tension, as shown in Figure 7, wherein the fill caps are moved into engagement with their respective seats to seal the fill openings of the fuel compartments.

Figures 13–16 inclusive, illustrate another form wherein a manually operable lever 107 is shown mounted adjacent the driver's cab whereby it may readily be operated by the driver of the truck. Lever 107 is operatively connected to an operating rod 108 having operative connections with the various rock-shafts 45 of the fill caps, thereby to release the fill caps from their seats and permit venting of the compartments, as in the previous figures.

The operating lever 107 is shown pivoted in a suitable bracket 109 and has one end of a connecting rod 111 connected thereto, the opposite end of which is connected to one arm of a bellcrank 112, pivotally mounted on the truck body. The opposite arm of bellcrank 112 is connected to the lower end of a rod 113, the upper end of which is connected to one arm of a bellcrank 114, the other arm of which is operatively connected to the forward end of the operating rod 108. Thus, it will be seen that when it is desired to vent the fuel compartments 6, 7, 8 and 9, the driver or operator simply swings the lever to the dotted line position, whereupon all of the fill caps are released and partially opened, as shown in Figure 10.

What we claim is:

1. The combination with a truck for transporting volatile liquids comprising an elongated tank body having a plurality of compartments therein, and the top wall of each compartment having an opening therein, and each of said openings having a closure which is normally secured in closed position by a locking mechanism, of a bottom-fill mechanism comprising a manifold having a plurality of conduits connecting it to the bottoms of said compartments, valves for selectively controlling liquid flow through said conduits, said manifold having a loading branch provided with means for detachably securing one end of a loading arm or hose thereto, the opposite end of which is connected to a source of liquid fuel under pressure whereby the tank compartments may be filled from their bottoms, under pressure, and a pressure responsive device in communication with said manifold for simultaneously effecting actuation of all of said locking mechanisms to release said top closures, when liquid flow is established through said loading branch to fill one or more of said compartments, thereby to automatically vent said compartments during the filling operation.

2. An apparatus according to claim 1, wherein the pressure responsive device comprises a closed chamber having a movable element therein, said chamber being in direct communication with said loading branch whereby a portion of the liquid fuel flowing through the loading branch to said compartments, during the filling operation, will enter said chamber and actuate said element to automatically effect the release of said top closures.

3. An apparatus according to claim 1, wherein the pressure responsive device for effecting actuation of said locking mechanisms includes interconnected operating and master cylinders, the master cylinder being in direct communication with said manifold.

4. The combination with a truck tank for transporting volatile liquids comprising an elongated tank body having a plurality of compartments therein each provided with a vent opening in its top wall, a closure for each of said openings, and means for normally locking said closures in closed positions, of a bottom-fill mechanism comprising a manifold having a plurality of conduits connecting it to the bottoms of said compartments, valves for controlling liquid flow through said conduits, said manifold having a loading branch provided with means for detachably securing one end of a loading arm or hose thereto, the other end of which is in communication with a liquid supply under pressure, said top closure locking means being inter-connected, and a hydraulically operated device in communication with said loading branch and having an operative connection with said locking means, whereby when liquid fuel is directed through said loading branch to the manifold, a portion thereof will enter said device and automatically effect actuation of said locking means and thereby release said top closures to vent the compartments during the filling operation.

5. A truck tank for transporting volatile liquids comprising an elongated tank body having a plurality of compartments therein each provided with an opening in its top wall, a closure for each of said openings, fluid operated means for normally locking said closures in closed positions, a manifold having a plurality of conduits connecting it to the bottoms of said compartments, valves for selectively controlling liquid flow through said conduits, said manifold having a loading branch provided with means for detachably securing one end of a loading arm or hose thereto, the other end of which is in communication with a liquid supply under pressure, said top closure locking means being inter-connected for simultaneous operation, an enlarged master cylinder having one end in communication with said loading branch and having a piston therein, a relatively smaller cylinder axially aligned with said master cylinder and having a piston therein operatively connected to the piston in the master cylinder for direct movement therewith, a pressure fluid in said smaller cylinder, and a conduit connecting said smaller cylinder with the fluid operated locking means of said top closures, whereby when liquid fuel is directed through said loading branch to the compartments, a portion thereof will enter the master cylinder and actuate said pistons, whereby a portion of the pressure fluid in said smaller cylinder is forced into the conduit connecting it to said fluid operated locking means, whereby said means are actuated to automatically effect the release of said top closures to permit air entrapped in said compartments to escape therefrom during the filling operation.

6. In a truck tank having a plurality of compartments, a manifold disposed at an elevation substantially below said compartments, conduits for establishing communication between said compartments and the manifold, valves for selectively controlling liquid flow from the manifold to the compartments, a vent opening in the upper portion of each compartment each having a closure, means for normally retaining said closures in closed position, an operating device for each closure retaining means, each including a movable element, said manifold having a loading branch provided with means for attaching thereto one end of a flexible loading conduit for supplying liquid fuel to the manifold under pressure, and a pressure responsive element in communication with said loading branch and having operative connections with the movable elements of said closure retaining means, whereby when liquid fuel is directed through the loading branch to the manifold, said pressure responsive element is actuated by fluid pressure to automatically effect the release of said vent closures to permit venting of the compartments during the filling operation.

7. In an apparatus according to claim 6, wherein means is provided for automatically closing said vents when fluid flow through said loading branch to the compartments is interrupted.

8. In a truck tank having a plurality of compartments, a manifold disposed at an elevation below said compartments, conduits for establishing communication between said compartments and the manifold, valves for selectively controlling liquid flow from the manifold to the compartments, a vent opening in the upper wall of each compartment each having a closure, a mechanism for normally locking each vent closure in closed position, each comprising a rockshaft, spring means operatively connecting said rockshafts with their respective closures and operating to normally retain the closures in sealing engagement with their respective seats, an operating device for each rockshaft, including a movable element having an operative connection with its respective rockshaft, said manifold having a loading branch provided with means for attaching thereto one end of a flexible loading conduit for supplying liquid fuel to the manifold under pressure, and a pressure responsive element in communication with said loading branch and having operative connections with the movable elements of said closure locking mechanisms, whereby when liquid fuel is directed through the loading branch to fill one or more of said compartments, said pressure responsive element is actuated by fluid pressure to operate the movable elements of said mechanisms and automatically effect the release of said vent closures to permit venting of the compartments during the filling operation.

9. In an apparatus according to claim 8, wherein the operating devices for the closures of said vents are fluid-operated to open the vents, and spring means is provided for automatically closing said vents when fluid flow through the loading branch to the compartments is interrupted.

10. A truck tank for transporting volatile liquids comprising an elongated tank having a plurality of compartments therein, a combination fill opening and vent in the upper wall of each compartment, fill caps for said openings, an operating member for each fill cap having operative connections with the central portions of their respective fill caps, means for normally locking said operating members in fill-cap sealing positions, each locking means comprising a rockshaft having an arm secured thereto and depending therefrom and having one end of a resilient element pivoted thereto, the other ends of said resilient elements having pivotal connections with their respective fill caps above said rockshafts whereby said resilient elements are normally under tension to secure the fill caps to their seats, elongated elements movable with said arms to engage their respective fill-cap operating members and partially unseat the fill caps, when said arms are actuated, a second arm secured to each rockshaft, and an elongated bar pivotally connected to said second arms and adapted, upon movement in one direction, to simultaneously partially rotate said rockshafts to release the tension in said resilient elements and thereby effect the release of the fill caps from their respective seats and permit them to open to vent said compartments.

11. A truck tank according to claim 10, wherein a single operating device is provided for actuating said elongated bar to effect the release of the fill caps from their respective seats.

12. A truck tank according to claim 10, wherein electric means is provided for operating said elongated bar to simultaneously effect the release of the fill caps from their seats.

13. A combination bottom-fill and vent mechanism for a multiple compartment liquid fuel tank having a top wall, an opening in said wall for each compartment and each opening having a seat, a hinged closure for each opening, means normally locking said closures in sealing engagement with their respective seats, each locking means comprising a rockshaft having a depending arm secured thereto and a U-shaped spring element having one end pivoted to the lower end of said arm, the other ends of said spring elements being pivotally connected to their respective closures substantially directly above said rockshafts, whereby when said rockshafts are in closure sealing positions, the pivotal connections between said arms and spring elements are disposed in over-the-center positions relative to the axes of their respective rockshafts and pivotal connections with the closures, and whereby said closures are normally retained in sealing engagement with their seats under spring tension, a manifold having a plurality of conduits connecting it to the bottoms of said compartments for conducting liquid fuel from the manifold thereto, valves for selectively controlling liquid flow from the manifold to said compartments, said manifold having a loading branch provided with means for detachably connecting one end of a flexible loading conduit thereto for delivering liquid fuel thereto under pressure, a pressure responsive device having a chamber therein, a movable element in said chamber and defining a wall thereof, means for establishing communication between the loading branch and said chamber whereby the movable element in said chamber is under the direct influence of the pressure of the liquid fuel flowing delivered to the manifold, when loading or charging the tank compartments, and said pressure responsive element having an operative connection with the rockshafts of said closure locking means, whereby when liquid fuel is flowing through the loading branch to the manifold and compartments, said pressure responsive element is actuated by the pressure of the liquid fuel to simultaneously actuate said rockshafts to automatically release said closures from their respective seats to permit free venting of said compartments during the filling operation.

14. A combination bottom-fill and vent mechanism as defined in claim 13, wherein a member is secured to each rockshaft for positively lifting each closure from its seat, when said locking means are actuated to release the closures.

WALTER V. BROWN.
WARREN F. LOGEMANN.

References Cited in the file of this patent

UNITED STATES PATENTS

| Number | Name | Date |
|---|---|---|
| 223,867 | Snyder | Jan. 27, 1880 |
| 2,037,020 | Holby | Apr. 14, 1936 |
| 2,096,374 | Jensen | Oct. 19, 1937 |
| 2,261,936 | Johnson | Nov. 11, 1941 |
| 2,430,956 | Scott | Nov. 18, 1947 |